United States Patent
Mou et al.

(10) Patent No.: US 9,989,974 B2
(45) Date of Patent: Jun. 5, 2018

(54) METHOD AND APPARATUS OF MASS FLOW CONTROLLING FOR USE IN INTEGRATED GAS DELIVERY SYSTEM

(71) Applicant: Beijing Sevenstar Flow Co., Ltd, Beijing (CN)

(72) Inventors: Changhua Mou, Beijing (CN); Nelson Urdaneta, Beijing (CN); Maolin Wang, Beijing (CN); Qianyi Su, Beijing (CN); Di Zhao, Beijing (CN)

(73) Assignee: BEIJING SEVENSTAR FLOW CO., LTD, Beijing (CN)

( * ) Notice: Subject to any disclaimer, the term of this patent is extended or adjusted under 35 U.S.C. 154(b) by 0 days. days.

(21) Appl. No.: 15/318,054

(22) PCT Filed: Jun. 25, 2014

(86) PCT No.: PCT/CN2014/080690
§ 371 (c)(1),
(2) Date: Dec. 12, 2016

(87) PCT Pub. No.: WO2015/188399
PCT Pub. Date: Dec. 17, 2015

(65) Prior Publication Data
US 2017/0115671 A1  Apr. 27, 2017

(30) Foreign Application Priority Data
Jun. 12, 2014 (CN) .......................... 2014 1 0260751

(51) Int. Cl.
*G05D 7/06* (2006.01)

(52) U.S. Cl.
CPC .................... *G05D 7/0635* (2013.01)

(58) Field of Classification Search
CPC .................. G05D 7/0635; Y10T 137/7761
(Continued)

(56) References Cited

U.S. PATENT DOCUMENTS 5,062,446 A * 11/1991 Anderson ............ G05D 7/0635
137/468
6,439,254 B1 * 8/2002 Huang ................ G05D 7/0635
137/487.5

(Continued)

FOREIGN PATENT DOCUMENTS

CN      101551675 A    10/2009

*Primary Examiner* — Eric Keasel
(74) *Attorney, Agent, or Firm* — Tianchen LLC

(57) ABSTRACT

An apparatus of mass flow controlling for use in an integrated gas delivery system, comprising an input terminal, a sensor unit, an electromagnetic valve, and a control unit. The control unit comprises an A/D converter, a microprocessor, and a valve control circuit. The A/D converter converts a flow rate setting signal inputted by the input terminal into a first digital signal, and converts a flow rate detection signal outputted by the sensor unit into a second digital signal. The microprocessor further comprises a control module and a calculation module. The valve control circuit opens the electromagnetic valve according to the first control signal only, and further regulates an openness of the electromagnetic valve according to the first control signal and the second control signal. It is concluded that response time of the mass flow control apparatus of the present invention is shorten, and control quality is improved.

16 Claims, 7 Drawing Sheets

(58) Field of Classification Search
USPC ...................................................... 137/487.5
See application file for complete search history.

(56) References Cited

U.S. PATENT DOCUMENTS

| | | | | |
|---|---|---|---|---|
| 7,640,078 B2* | 12/2009 | Smirnov | .............. | G05D 7/0635 |
| | | | | 137/12 |
| 9,027,585 B2* | 5/2015 | Smirnov | .............. | G05D 7/0635 |
| | | | | 137/487.5 |
| 9,081,388 B2* | 7/2015 | Tanaka | ................. | G05D 7/0635 |

* cited by examiner

METHOD AND APPARATUS OF MASS FLOW CONTROLLING FOR USE IN INTEGRATED GAS DELIVERY SYSTEM

CROSS-REFERENCE TO RELATED APPLICATION

This application claims the priority benefit of International Patent Application Serial No. PCT/CN2014/080690, filed Jun. 25, 2014, which is related to and claims the priority benefit of China patent application serial No. 201410260751.7, filed Jun. 12, 2014. The entirety of each of the above-mentioned patent applications is hereby incorporated by reference herein and made a part of this specification.

FIELD OF THE INVENTION

The present invention relates to the field of semiconductor manufacturing technology, and particularly to a method and an apparatus of mass flow controlling for use in an integrated gas delivery system.

BACKGROUND OF THE INVENTION

Measuring and controlling of a flow are crucial contents for an integrated gas delivery system. One commonly used device is a mass flow controller (MFC), which controls the mass of the introduced gas or liquid tightly. Referring to the FIG. 1, a block diagram of a prior art MFC is shown. The prior art MFC comprises a sensor 11, an electromagnetic valve 12, a sensor driver circuit 14 coupled to the sensor 11 in order to receive a detection signal from that, an electromagnetic valve driver circuit 15 coupled to the electromagnetic valve 12 in order to adjust a flow through that, a microprocessor 13 coupled to the sensor driver circuit 14 and the electromagnetic valve driver circuit 15 respectively, and an A/D converter 16. Various parameters of the gas or the liquid introduced into a tubular shunt 17, such as a flow, a flow rate, etc., are sensed by the sensor 11 and converted into an electronic signal to be outputted to the sensor driver circuit 14 for processing. The A/D converter 16 converts an inputted setting signal into a first digital signal, and converts the processed signal outputted by the sensor driver circuit 14 into a second digital signal. The microprocessor 13 is coupled to the A/D converter 16 for receiving the first digital signal and the second digital signal to generate a flow control signal. Then, the electromagnetic valve driver circuit 15 converts the flow control signal outputted by the microprocessor 13 into an analog signal to control the electromagnetic valve 12, so as to control the flow and the flow rate of the gas or the liquid. Referring to the FIG. 2, which is a schematic diagram of a closed-loop circuit according to the prior art MFC. In general, the mechanism of the prior art MFC is a control system having a closed-loop circuit. A difference in a detection signal outputted by a sensor 21 and a setting signal is calculated by a PID module 22 and converted into a control voltage to control an openness of an electromagnetic valve 23, so as to control a flow of a fluid 24 tightly. Referring to the FIG. 3, a schematic diagram of an electromagnetic valve according to the prior art MFC is shown. The electromagnetic valve comprises an elastic component 31 positioned above a fluid inlet in order to generate an elastic force downward to close the fluid inlet, and an electromagnetic coil 32 around the elastic component 31 in order to generate an electromagnetic force opposite to the elastic force to open the fluid inlet when a current is provided. A balance between the elastic force and the electromagnetic force is required to adjust the height distancing the fluid inlet, so as to stable the flow rate of the fluid. However, the electromagnetic force is not proportionally related to the height. With the change of the height, nonlinear change of the electromagnetic force is obviously exposed out.

Although the conventional MFC may be adequate for a flow control at the point of 100% of a full scale, it has significant drawbacks of big overshoot and long response time for a flow control at the point of 2% of a full scale. It is difficult for a conventional MFC to ensure a timely control response for a flow rate at any point in a 2% to 100% of a full scale. Therefore, a new MFC is needed to precisely control a flow rate of the gas at any point in a 100% of a full scale, and also needed to meet the needs for various using environments.

Accordingly, it is an urgent problem to be solved that a new MFC is required to complete a precisely control for a flow rate in a wide scale.

BRIEF SUMMARY OF THE DISCLOSURE

To overcome the problems as mentioned above, it is an object of the present invention to provide a method and an apparatus of mass flow controlling having a better control quality and shorter response time.

To achieve above object, the present invention provides a mass flow control apparatus, comprising an input terminal used to input a flow rate setting signal, a sensor unit coupled to a fluid to sense its flow rate and output a flow rate detection signal, an electromagnetic valve coupled to the fluid for regulating its flow rate, and a control unit. The control unit comprises an A/D converter, a microprocessor and a valve control circuit. The A/D converter converts the flow rate setting signal inputted by the input terminal into a first digital signal, and converts the flow rate detection signal outputted by the sensor unit into a second digital signal. The microprocessor is coupled to the A/D converter for receiving the first digital signal outputted by the A/D converter and the second digital signal outputted by the A/D converter, or receiving the first digital signal inputted directly by the input terminal and the second digital signal outputted by the A/D converter. The microprocessor further includes a control module and a calculation module, wherein, the control module is used to generate and output a first control signal according to the corresponding first digital signal outputted by the A/D converter or inputted directly by the input terminal, and the calculation module is used to generate and output a second control signal by running a calculation for a difference in the first digital signal outputted by the A/D converter or inputted directly by the input terminal and the second digital signal outputted by the A/D converter. The valve control circuit is coupled to the microprocessor for opening the electromagnetic valve according to the first control signal only, or regulating an openness of the electromagnetic valve according to the first control signal and the second control signal.

Preferably, the valve control circuit comprises a first valve control circuit used to receive the first control signal and generate a first openness control signal, a second valve control circuit used to receive the second control signal and generate a second openness control signal, and a third valve control circuit coupled to the first valve control circuit and the second valve control circuit for receiving the first openness control signal and the second openness control signal to control the electromagnetic valve. When only the first openness control signal is received, the first openness control signal is outputted to the electromagnetic valve to control its opening. When the first openness control signal and the second openness control signal are simultaneously received, the superposition of the first openness control signal and the second openness control signal is outputted to the opened electromagnetic valve to control its openness.

Preferably, the first valve control circuit and the second valve control circuit are designed by the means of D/A or PWM filtering to proceed a digital-to-analog conversion for the first control signal and the second control signal to generate the first openness control signal and the second openness control signal.

Preferably, the microprocessor also includes a storage module coupled to the control module for storing a valve model which characterizes a correspondence relation between the first digital signal and the first control signal. The control module outputs the first control signal corresponding to the first digital signal based on the valve model.

Preferably, the valve model is obtained based on pre-collected data.

Preferably, the valve model is fitted based on the pre-collected data by a fitting function which is a piecewise function or a continuous function.

The present invention also provides a second mass flow control apparatus, comprising an input terminal used to input a flow rate setting signal, a sensor unit coupled to a fluid to sense its flow rate and output a flow rate detection signal, an electromagnetic valve coupled to the fluid for regulating its flow rate, and a control unit. The control unit comprises an A/D converter, a microprocessor and a valve control circuit. The A/D converter converts the flow rate setting signal inputted by the input terminal into a first digital signal, and converts the flow rate detection signal outputted by the sensor unit into a second digital signal. The microprocessor is coupled to the A/D converter for receiving the first digital signal outputted by the A/D converter and the second digital signal outputted by the A/D converter, or receiving the first digital signal inputted directly by the input terminal and the second digital signal outputted by the A/D converter. The microprocessor further includes a control module and a calculation module, wherein, the control module is used to generate a first control signal according to the corresponding first digital signal outputted by the A/D converter or inputted directly by the input terminal, and the calculation module is used to generate a second control signal by proceeding a calculation for an adjusted difference in the first digital signal outputted by the A/D converter or inputted directly by the input terminal and the second digital signal outputted by the A/D converter by a first coefficient, which is a ratio of the first digital signal and a difference in the first digital signal and the first control signal. The valve control circuit is coupled to the microprocessor for opening the electromagnetic valve according to the first openness control signal generated basing on the first control signal, or regulating an openness of the electromagnetic valve according to the first openness control signal and the second openness control signal. Wherein, the second openness control signal is generated basing on the second control signal and the first coefficient.

Preferably, the valve control circuit comprises a first valve control circuit used to receive the first control signal and generate the first openness control signal basing on an initial digital-to-analog conversion proportion, a second valve control circuit used to receive the second control signal and generate the second openness control signal basing on a ratio of the initial digital-to-analog conversion proportion and the first coefficient, and a third valve control circuit coupled to the first valve control circuit and the second valve control circuit for receiving the first openness control signal and the second openness control signal to control the electromagnetic valve. When only the first openness control signal is received, the first openness control signal is outputted to the electromagnetic valve to control its opening. When the first openness control signal and the second openness control signal are simultaneously received, the superposition of the first openness control signal and the second openness control signal is outputted to the opened electromagnetic valve to control its openness.

Preferably, the first valve control circuit and the second valve control circuit are designed by the means of D/A or PWM filtering to proceed a digital-to-analog conversion for the first control signal and the second control signal to generate the first openness control signal and the second openness control signal.

Preferably, the microprocessor also includes a storage module coupled to the control module and the calculation module for storing a valve model which characterizes a correspondence relation between the first digital signal and the first control signal. The control module generates the first control signal basing on the valve model. The calculation module calculates out the first coefficient basing on the valve model to generate the second control signal.

Preferably, the valve model is obtained basing on pre-collected data, or the valve model is fitted to a piecewise function or a continuous function based on the pre-collected data.

The present invention also provides a third mass flow control apparatus, comprising an input terminal used to input a flow rate setting signal, a sensor unit coupled to a fluid to sense its flow rate and output a flow rate detection signal, an electromagnetic valve coupled to the fluid for regulating its flow rate, and a control unit. The control unit comprises an A/D converter, a microprocessor and a valve control circuit. The A/D converter converts the flow rate setting signal inputted by the input terminal into a first digital signal, and converts the flow rate detection signal outputted by the sensor unit into a second digital signal. The microprocessor is coupled to the A/D converter for receiving the first digital signal outputted by the A/D converter and the second digital signal outputted by the A/D converter, or receiving the first digital signal inputted directly by the input terminal and the second digital signal outputted by the A/D converter. The microprocessor further includes a control module and a calculation module. The control module is used to generate a first control signal according to an adjusted decomposition signal by a second coefficient, wherein, the decomposition signal is generated by the first digital signal, and the second coefficient is a ration of the first digital signal and the decomposition signal. The calculation module is used to generate a second control signal by proceeding a calculation for an adjusted difference in the first digital signal outputted by the A/D converter or inputted directly by the input terminal and the second digital signal outputted by the A/D converter by a first coefficient, which is a ratio of the first digital signal and a difference in the first digital signal and the decomposition signal. The valve control circuit is coupled to the microprocessor for opening the electromagnetic valve according to the first openness control signal generated basing on the first control signal and the second coefficient, or regulating an openness of the electromagnetic valve according to the first openness control signal and the second openness control signal. wherein, the second openness control signal is generated basing on the second control signal and the first coefficient.

Preferably, the valve control circuit comprises a first valve control circuit used to receive the first control signal and generate the first openness control signal basing on a ratio of an initial digital-to-analog conversion proportion and the second coefficient, a second valve control circuit used to receive the second control signal and generate the second openness control signal basing on a ratio of the initial digital-to-analog conversion proportion and the first coefficient, and a third valve control circuit coupled to the first valve control circuit and the second valve control circuit for receiving the first openness control signal and the second openness control signal and outputting them to the electromagnetic valve. When only the first openness control signal is received, the first openness control signal is outputted to the electromagnetic valve to control its opening. When the first openness control signal and the second openness control signal are simultaneously received, the superposition of the first openness control signal and the second openness control signal is outputted to the opened electromagnetic valve to control its openness.

Preferably, the microprocessor also includes a storage module coupled to the control module and the calculation module for storing a valve model which characterizes a correspondence relation between the first digital signal and the decomposition signal. The control module calculates out the second coefficient basing on the valve model to generate the first control signal. The calculation module calculates out the first coefficient basing on the valve model to generate the second control signal.

Preferably, the valve model is obtained based on pre-collected data, or the valve model is fitted to a piecewise function or a continuous function based on the pre-collected data.

The present invention also provides a method of mass flow controlling applied to a mass flow control apparatus, comprising the steps of:

S11, receiving a flow rate setting signal which is used as or converted into a first digital signal;

S12, generating a corresponding first control signal basing on the first digital signal, and opening an electromagnetic valve basing on the first control signal;

S13, sensing a flow rate of a fluid and outputting a flow rate detection signal;

S14, converting the flow rate detection signal into a second digital signal, and generating and outputting a second control signal by a calculation for a difference in the first digital signal and the second digital signal;

S15, controlling an openness of the electromagnetic valve according to the first control signal and the second control signal.

The present invention also provides a second method of mass flow controlling applied to a mass flow control apparatus, comprising the steps of:

S21, receiving a flow rate setting signal which is used as or converted into a first digital signal;

S22, generating and outputting a corresponding first control signal basing on the first digital signal;

S23, generating a first openness control signal basing on the first control signal, and opening an electromagnetic valve basing on the first openness control signal;

S24, sensing a flow rate of a fluid and outputting a flow rate detection signal;

S25, converting the flow rate detection signal into a second digital signal, and generating a second control signal by a calculation for an adjusted difference in the first digital signal and the second digital signal by a first coefficient, which is a ratio of the first digital signal and a difference in the first digital signal and the first control signal;

S26, generating a second openness control signal according to the second control signal and the first coefficient, and controlling an openness of the electromagnetic valve according to the first openness control signal and the second openness control signal.

The present invention also provides a third method of mass flow controlling applied to a mass flow control apparatus, comprising the steps of:

S31, receiving a flow rate setting signal which is used as or converted into a first digital signal;

S32, generating a corresponding decomposition signal basing on the first digital signal;

S33, generating a first control signal by adjusting the decomposition signal using a second coefficient;

S34, generating a first openness control signal basing on the first control signal and the second coefficient, and opening an electromagnetic valve basing on the first openness control signal;

S35, sensing a flow rate of a fluid and outputting a flow rate detection signal;

S36, converting the flow rate detection signal into a second digital signal, and generating a second control signal by a calculation for an adjusted difference in the first digital signal and the second digital signal by a first coefficient, which is a ratio of the first digital signal and a difference in the first digital signal and the decomposition signal;

S37, generating a second openness control signal according to the second control signal and the first coefficient, and controlling an openness of the electromagnetic valve according to the first openness control signal and the second openness control signal.

The present invention has attained a preferable technology effect by utilizing two control signals to control an electromagnetic valve. The first control signal is firstly generated by a flow rate setting signal to open the electromagnetic valve to a certain openness. Then the second control signal is generated by a PID algorithm to regulate the openness of the opened electromagnetic valve. Comparing to the prior art MFC, in which the openness is opened and regulated only by the PID algorithm, the present invention can greatly reduce the nonlinear control of the electromagnetic valve, speed up the response speed, so as to adapt a wider scale from 2% FS to 100% FS.

DETAILED DESCRIPTION OF THE EMBODIMENTS

The present invention will be described in further details hereinafter by referring to the accompanying drawings, so as to provide a better understanding of the present invention. However, various modifications and variations can be made by the ordinary skilled in the art without departing the spirit and scope of the present invention.

Figure 1:
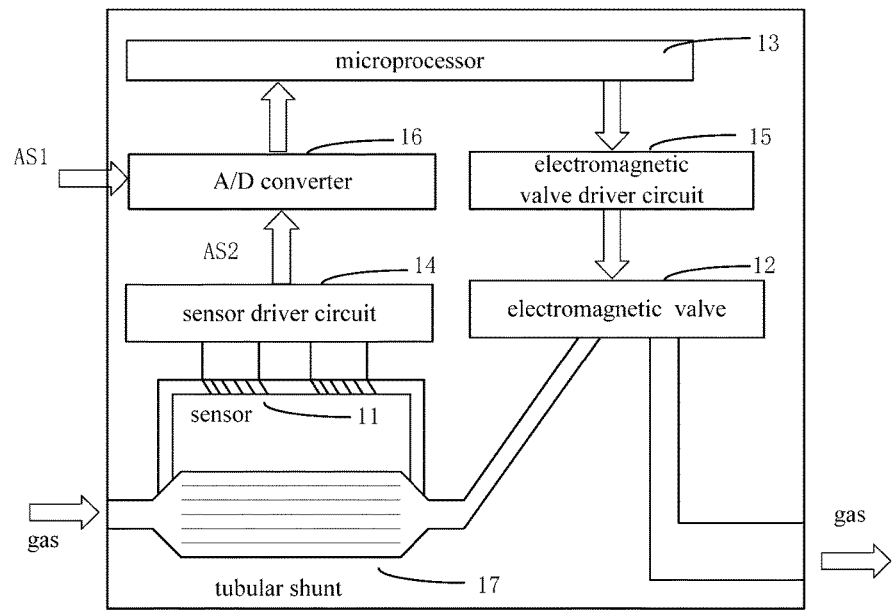
FIG. 1 is a block diagram of a prior art MFC.
Figure 2:
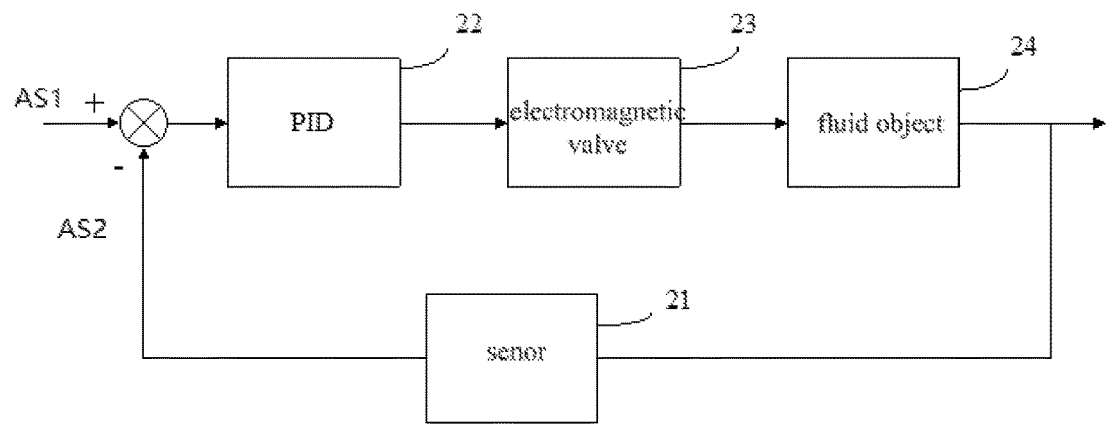
FIG. 2 is a schematic diagram of a closed-loop circuit according to the prior art MFC.
Figure 3:
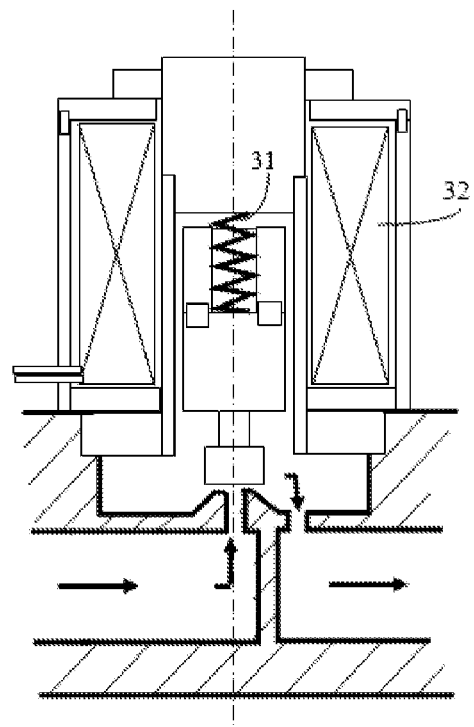
FIG. 3 is a schematic diagram of an electromagnetic valve according to the prior art MFC.
Figure 4:
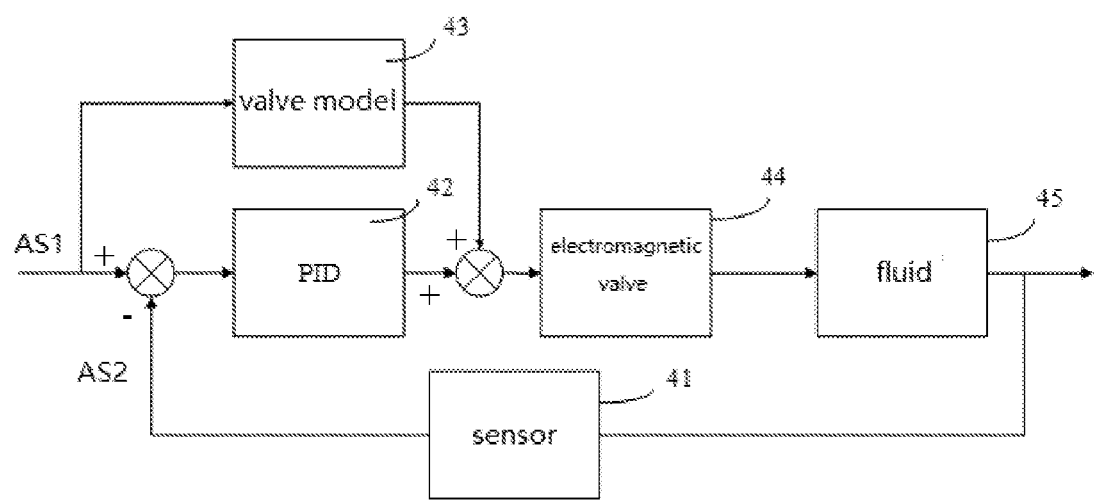
FIG. 4 is a schematic diagram illustrating a control mechanism of a MFC according to the first embodiment of the present invention.

Referring to FIG. 4, where a control mechanism of a MFC according to the first embodiment of the present invention is shown. As shown in the FIG. 4, the MFC of the present invention adds a control part having an open-loop circuit compared to the prior art in the FIG. 2. A setting signal is firstly inputted by an input terminal, and converted into a first control voltage basing on a valve model 43 to be outputted to an electromagnetic valve 44, so as to directly open the electromagnetic valve 44 to generate a fluid 45. Next, a sensor 41 is used to sense a flow rate of the fluid 45 to generate and output a detection signal. A difference in the detection signal and the setting signal is used as a deviation value to proceed a calculation via a PID module 42, so as to generate and output a second control voltage to the electromagnetic valve 44. Finally, a superposition of the first control voltage and the second control voltage is used to regulate the openness of the electromagnetic valve 44, so as to tightly control the flow rate of the fluid 45. Wherein, the first control voltage is used to correct the nonlinearity of the electromagnetic valve, and the second control voltage is used for the PID control.

The present invention will be further described in details hereinafter by referring to some embodiments.

The First Embodiment

Figure 5:
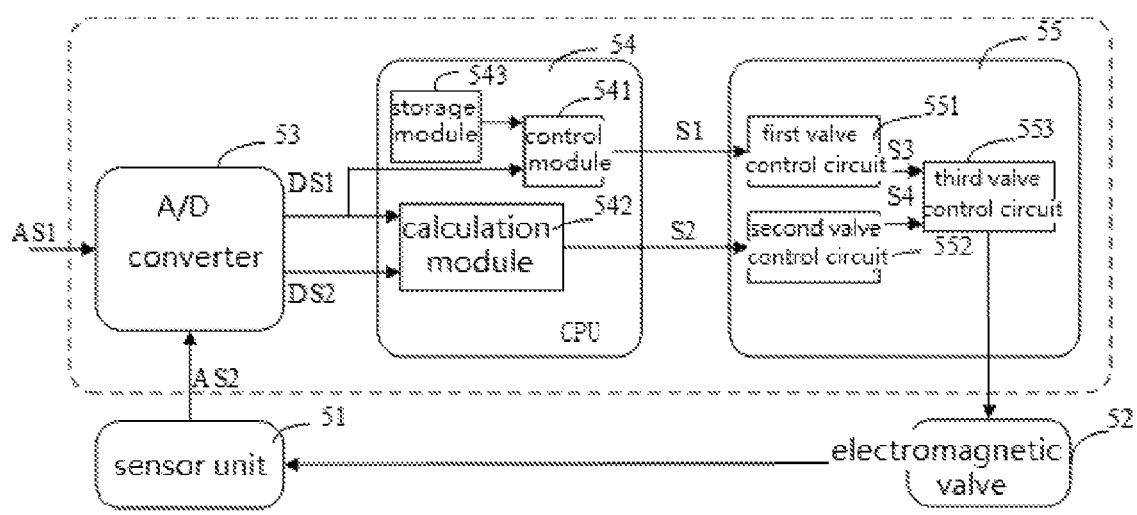
FIG. 5 is a block diagram of a MFC according to the first embodiment of the present invention.

Referring to the FIG. 5, which is a block diagram of a MFC according to the first embodiment. The mass flow control apparatus comprises: an input terminal used to input a flow rate setting signal, a sensor unit 51 coupled to a fluid to sense its flow rate and output a flow rate detection signal, a control unit and an electromagnetic valve 52. Wherein, the flow rate setting signal inputted by the input terminal and the flow rate detection signal outputted by the sensor unit 51 are characterized by voltage values in a wide voltage range respectively, e. g., in the range of 0-5V, which represent a setting flow and a detection flow corresponding to a full scale respectively. However, it should be noted that the flow rate setting signal may also be a digital signal, which will not be limited by the present invention. The control unit aims to generate an openness control signal, and output that to the electromagnetic valve 52, so as to control the flow rate of the fluid, basing on the flow rate setting signal and the flow rate detection signal. The control unit includes an A/D converter 53, a microprocessor 54 and a valve control circuit 55. The A/D converter 53 is coupled to the sensor unit 51 and the microprocessor 54 for converting a flow rate detection signal AS2 outputted by the sensor unit 51 into a second digital signal DS2 outputted to the microprocessor 54. In addition, the A/D converter 53 is also coupled between the input terminal and the microprocessor 54 for converting a flow rate setting signal AS1 inputted by the input terminal into a first digital signal DS1 outputted to the microprocessor 54, when the flow rate setting signal AS1 is an analog signal. The microprocessor 54 is coupled to the A/D converter for receiving the first digital signal DS1 and the second digital signal DS2. However, it should be noted that, the flow rate setting signal not only could be an analog signal, such as the AS1, which need to be converted into a digital signal via the A/D converter, such as the DS1, but also could be a digital signal, such as the DS1, which is directly inputted to the microprocessor without through the A/D converter. Two control signals S1 and S2 are generated by the microprocessor 54 basing on the first digital signal DS1 and the second digital signal DS2, and outputted to the valve control circuit 55. Then openness control signals corresponding to the control signals S1 and S2 respectively are generated by the valve control circuit 55 and outputted for controlling the electromagnetic valve 52. Finally, the flow rate of the fluid through the pipeline is precisely controlled.

Referring to the FIG. 5, again. The microprocessor 54 comprises a control module 541 and a calculation module 542. The control module 541 is used to receive the first digital signal DS1 and generate the corresponding first control signal S1. Specifically, a valve model, which is used to characterize a correspondence relation between the first digital signal and the first control signal, and stored in a storage module 543, is adopted to generate the first control signal S1 basing on the first digital signal DS1. The storage module 543, such as EEPROM, may be embedded into the microprocessor 54 (shown in the FIG. 5), or external to the microprocessor 54, which will not be limited by the present invention. The valve model may be obtained based on pre-collected data, for example, various first digital signals DS1 and the corresponding first control signals S1 are recorded in the form of a table. The valve model also may be fitted based on the pre-collected data by a fitting function, e. g., a piecewise function or a continuous function, which is used to describe the correspondence relation between the first digital signal and the first control signal.

Referring to the FIG. 5, again. The calculation module 542 is used to generate a second control signal S2 by running a calculation for a difference in the first digital signal DS1 and the second digital signal DS2 received. Specifically, a PID algorithm is applied to proceed the calculation to generate the second control signal S2.

Referring to the FIG. 5, again. The valve control circuit 55 coupled to the microprocessor 54 comprises a first valve control circuit 551, a second valve control circuit 552, and a third valve control circuit 553. The first valve control circuit 551 is used to receive the first control signal S1 and generate a corresponding first openness control signal S3. The second valve control circuit 552 is used to receive the second control signal S2 and generate a corresponding second openness control signal S4. The first valve control circuit 551 and the second valve control circuit 552 are designed by the means of D/A or PWM filtering to proceed a digital-to-analog conversion for the first control signal S1 and the second control signal S2 to generate the first openness control signal S3 and the second openness control signal S4. The third valve control circuit 553 is coupled to the first valve control circuit 551 and the second valve control circuit 552. When only the first openness control signal S3 is received, the first openness control signal S3 is outputted to the electromagnetic valve 52 to control its opening. When the first openness control signal S3 and the second openness control signal S4 are simultaneously received, the superposition of them is outputted to the opened electromagnetic valve 52 to control its openness.

The flow control method for the mass flow control apparatus according to the present embodiment will be described in detail hereinafter by referring to specific examples. The flow rate setting signal is usually ranged from 0 to 5V, which is indicative of the setting flow rate of from 0 to 100% of a full scale. When a control voltage required by the electromagnetic valve is about 12V, the flow rate can cover a 100% full scale range, and the voltage value of the corresponding flow rate setting signal is 5V. It is assumed that the flow rate setting signal AS1 is equal to 5V. The control method for using the mass flow control apparatus of the present invention in this embodiment is divided into two stages.

At the first stage, the flow rate setting signal, a voltage value received by the input terminal, e. g., 5V, is converted into the corresponding first digital signal DS1-5V at an initial analog-to-digital conversion proportion via the A/D converter 53 (e. g., voltage values of 0-5V correspond to 16-bit digital signals of 0-65535, respectively.). The valve model fitted by a piecewise function, characterizes a correspondence relation between the first digital signal and the first control signal, e. g., when the first digital signal DS1 corresponds to a setting flow rate of from 2% to 50% of a full scale, the received first control signal S1 equals to a digital signal DS1'-2V which corresponds to a voltage value of 2V; when the first digital signal DS1 corresponds to a setting flow rate of from 50% to 100% of a full scale, the received first control signal S1 equals to a digital signal DS1'-3V which corresponds to a voltage value of 3V. Therefore, the first digital signal DS1-5V received by the control module 541 is converted into the corresponding first control signal DS1'-3V for outputting to the first valve control circuit 551 basing on the valve model. Then, the first control signal DS1'-3V outputted to the first valve control circuit 551 is converted into the first openness control signal S3 with a control voltage value of 9V to be outputted to the third valve control circuit 553 for controlling the opening of the electromagnetic valve 52, basing on an initial digital-to-analog conversion proportion (e. g., 16-bit digital signals of 0-65535 correspond to voltage values of 0-5V, respectively) and a correspondence relation between a flow rate voltage and an electromagnetic valve control voltage. Since the sensor unit 51 has not sensed the flow rate of the fluid in this process, the calculation module 542 and the second valve control circuit 553 remain in the not-operation state.

At the second stage, after opening the electromagnetic valve 52, a flow rate detection signal AS2 with a voltage value of 3V is received by the sensor unit 51, and converted into the second digital signal DS2-3V via the A/D converter 53 to be outputted to the calculation module 542 to execute a PID algorithm. Specifically, the calculation module 542 is used to generate the second control signal S2 by running a proportional-integral-derivative (PID) control algorithm for a difference in the first digital signal DS1-5V and the second digital signal DK-3V. Then, the second control signal S2 outputted to the second valve control circuit 552 is converted into the second openness control signal S4 to be outputted to the third valve control circuit 553, basing on an initial digital-to-analog conversion proportion (e. g., 16-bit digital signals of 0-65535 correspond to voltage values of 0-5V, respectively) and a correspondence relation between a flow rate voltage and an electromagnetic valve control voltage. Now, the first openness control signal S3 and the second openness control signal S4 are simultaneously received by the third valve control circuit 553. So, the superposition of the first openness control signal S3 and the second openness control signal S4 is outputted to the opened electromagnetic valve to regulate its openness for regulating its flow rate. Then, the regulated flow rate of the fluid is sensed by the sensor unit again. The received detection signal is successively passed through the A/D converter, the calculation module, the second valve control circuit and the third valve control circuit, and is converted into another second openness control signal. The above process is repeated until the voltage value of the second openness control signal S4 is equal to 3V. Finally, the required control voltage 12V applied to the electromagnetic valve 52 is satisfied.

Accordingly, the flow rate setting signal received from the input terminal is converted into the first control signal based on the valve model via the microprocessor, which is outputted to the first valve control circuit to directly open the electromagnetic valve. Therefore, the nonlinear change of the electromagnetic force at the electromagnetic valve opening stage in the prior art is corrected. Then, the second control signal is generated by running a PID algorithm via the microprocessor. The first control signal and the second control signal are converted into the first openness control signal and the second openness control signal, respectively, the superposition of which is utilized to regulate the openness of the opened electromagnetic valve. In conclusion, the present invention finally generates two valve control voltages based on the two digital signals received by the microprocessor, one of which is used to directly open the electromagnetic valve to a certain openness, and another of which is generated by a PID algorithm, and is used to regulate the openness of the opened electromagnetic valve by superposition with the first valve control voltage. Therefore, the nonlinear change of the electromagnetic force at the electromagnetic valve opening stage is avoided, and the response speed is accelerated. In the embodiment, assuming that the corresponded voltage value of the flow rate setting signal is 5V, the corresponded voltage value of the generated first control signal is 3V, which generates a valve control voltage of 9V to open the electromagnetic valve to a corresponding openness, so that a flow rate of the fluid is generated. Then, a flow rate detection signal of 3V corresponding to the flow rate of the fluid and the flow rate setting signal of 5V are outputted to the calculation module to proceed a PID algorithm, so as to generate a second control signal. The second control signal is outputted to the second valve control circuit for generating a second openness control signal, which is used to regulate the openness of the opened electromagnetic valve by superposition with the initial valve control voltage of 9V. Finally, the required control voltage 12V applied to the electromagnetic valve 52 is satisfied. It should be noted that the voltage value of the first control signal generated by the flow rate setting signal of 5V can be arbitrary, as long as the control voltage of the electromagnetic valve generated by the first control signal is not greater than the maximum control voltage allowed by the openness of the electromagnetic valve.

Figure 6:
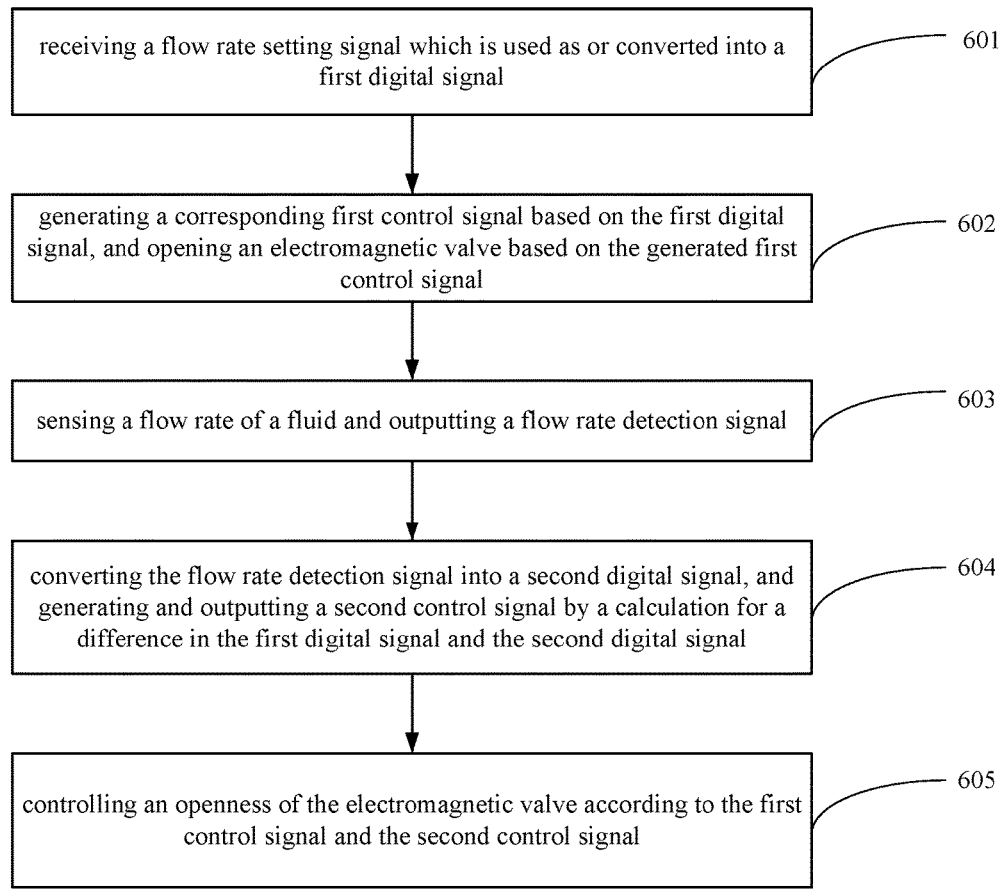
FIG. 6 is a flow sheet of a mass flow controlling method according to the first embodiment of the present invention.

A method of mass flow controlling applied to a mass flow control apparatus in the embodiment, shown in the FIG. 6, comprising the steps of:

S601, receiving a flow rate setting signal which is used as or converted into a first digital signal.

In this step, if the flow rate setting signal inputted from the input terminal is an analog signal AS1, it is converted into the first digital signal DS1 via the A/D converter. If the flow rate setting signal inputted from the input terminal is a digital signal, it is directly used as the first digital signal DS1 without conversion.

S602, generating a corresponding first control signal based on the first digital signal, and opening an electromagnetic valve based on the generated first control signal.

In this step, the first digital signal DS1 is converted into the corresponding first control signal S1 based on a valve model via the control module of the microprocessor. The valve model is used to characterize a correspondence relation between the first digital signal DS1 and the first control signal S1, which can be obtained based on pre-collected data, or fitted based on the pre-collected data by a fitting function which is a piecewise function or a continuous function. Then, the first control signal S1 is outputted to the first valve control circuit for generating a first openness control signal S3, which is applied to the electromagnetic valve for opening it.

S603, sensing a flow rate of a fluid and outputting a flow rate detection signal.

In this step, after opening the electromagnetic valve by the first openness control signal S3, a fluid flows through the pipeline. Then, the sensor unit senses the flow rate of the fluid and outputs a flow rate detection signal AS2.

S604, converting the flow rate detection signal into a second digital signal, and generating and outputting a second control signal by a calculation for a difference in the first digital signal and the second digital signal.

In this step, the flow rate detection signal AS2 is converted into a second digital signal DS2 via the A/D converter. The calculation module of the microprocessor generates a second control signal S2 by running a PID algorithm for a difference in the first digital signal DS1 and the second digital signal DS2, and outputs it.

S605, controlling an openness of the electromagnetic valve according to the first control signal and the second control signal.

In this step, the second control signal S2 is received by the second valve control circuit for generating a second openness control signal S4. Then, the second openness control signal S4 is outputted to the third valve control circuit for regulating the openness of the electromagnetic valve by superposition with the received first openness control signal S3, so as to regulate the flow rate of the fluid. Thereafter, steps S603 to S605 are repeated until the flow rate of the fluid reaches the setting flow rate.

In conclusion, the method and the apparatus of mass flow controlling according to the embodiment of the present invention firstly applies a control voltage to the electromagnetic valve for opening it to a certain openness before running a PID algorithm, and then the openness of the electromagnetic valve is further regulated by running a PID algorithm. Therefore, the nonlinear change of the electromagnetic force at the electromagnetic valve opening stage is avoided, and the response speed is accelerated.

The Second Embodiment

The method and the apparatus of mass flow controlling according to the second embodiment of the present invention will be further described in details hereinafter by referring to FIGS. 7-8.

Figure 7:
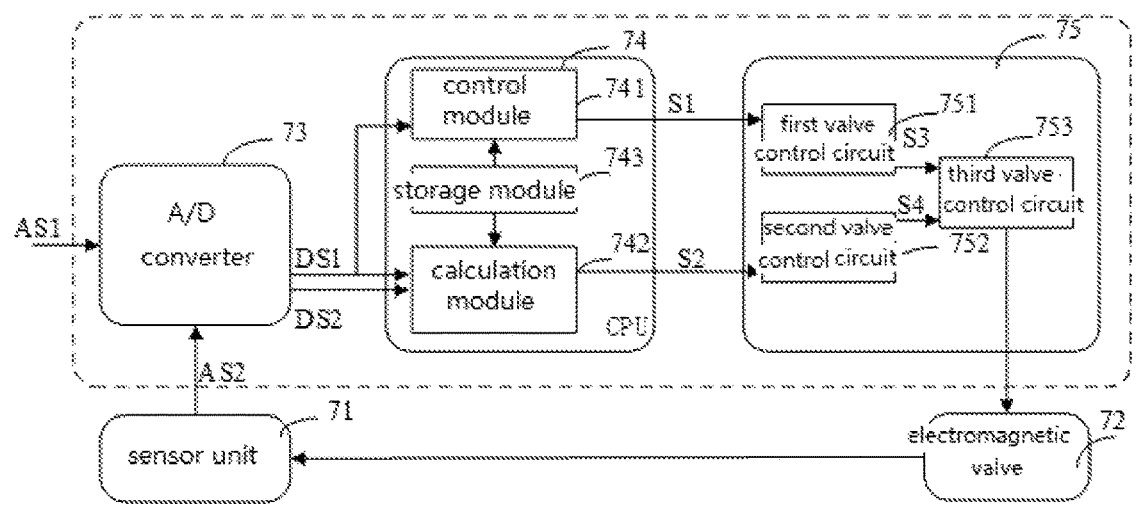
FIG. 7 is a block diagram of a MFC according to the second embodiment of the present invention.

Referring to the FIG. 7, which is a block diagram of a MFC according to the second embodiment of the present invention. The mass flow control apparatus comprises: an input terminal used to input a flow rate setting signal AS1, a sensor unit 71 coupled to a fluid to sense its flow rate and output a flow rate detection signal AS2, a control unit and an electromagnetic valve 72. The control unit aims to generate an openness control signal, and output that to the electromagnetic valve 52, so as to control the flow rate of the fluid, basing on the flow rate setting signal AS1 and the flow rate detection signal AS2. The control unit includes an A/D converter 73, a microprocessor 74 and a valve control circuit 75. The A/D converter 73 is coupled between the input terminal and the microprocessor 74 for converting a flow rate setting signal AS1 inputted by the input terminal into a first digital signal DS1 outputted to the microprocessor 74. In addition, the A/D converter 73 is also coupled to the sensor unit 71 for converting a flow rate detection signal AS2 into a second digital signal DS2 outputted to the microprocessor 74. However, it should be noted that, the flow rate setting signal not only could be an analog signal, such as the AS1, which need to be converted into a digital signal via the A/D converter, such as the DS1, but also could be a digital signal, such as the DS1, which is directly inputted to the microprocessor without through the A/D converter. Two control signals S1 and S2 are generated by the microprocessor 74 basing on the first digital signal DS1 and the second digital signal DS2, and outputted to the valve control circuit 75. Then openness control signals corresponding to the control signals S1 and S2 respectively are generated by the valve control circuit 75 and outputted for controlling the electromagnetic valve 72. Finally, the flow rate of the fluid through the pipeline is precisely controlled.

Referring to the FIG. 7, again. The microprocessor 74 comprises a control module 741 and a calculation module 742. The control module 741 is used to receive the first digital signal DS1 and generate the corresponding first control signal S1. Specifically, a valve model, which is used to characterize a correspondence relation between the first digital signal and the first control signal, and stored in a storage module 743, is adopted to generate the first control signal S1 basing on the first digital signal DS1. The storage module 743, such as EEPROM, may be embedded into the microprocessor 74 (shown in the FIG. 7), or external to the microprocessor 74, which will not be limited by the present invention. The valve model may be obtained based on pre-collected data, for example, various first digital signals DS1 and the corresponding first control signals S1 are recorded in the form of a table. The valve model also may be fitted based on the pre-collected data by a fitting function, e. g., a piecewise function or a continuous function, which is used to describe the correspondence relation between the first digital signal and the first control signal.

Referring to the FIG. 7, again. The calculation module 742 is used to generate a second control signal S2 by running a calculation (e. g., a PID algorithm) for an adjusted difference in the first digital signal DS1 and the second digital signal DS2 by a first coefficient P1. The calculation module 742 is also coupled to the storage module 743 for calculating the first coefficient P1, which is a ratio of the first digital signal and a difference in the first digital signal and the first control signal, based on a valve model of the storage module 743. Before running a PID algorithm, the difference D in the first digital signal and the first control signal is adjusted to D' by proportion of the first coefficient P1, i. e. D'=D×P1. If the flow rate setting signal AS1 ranged from 0 to AS1max is converted into a M-bit digital signal DS1 at an initial analog-to-digital conversion proportion $P_{AD}$ via the A/D converter, each digital signal corresponds a voltage range of $AS1max/2^M$, that is, the resolutions of the difference D is $AS1max/2^M$. After the difference D is adjusted by the first coefficient P1, each digital signal corresponds a voltage range of $(AS1-\text{voltage value corresponded by S1})/2^M$, that is, the resolution of the adjusted difference D is changed into the $(AS1-\text{voltage value corresponded by S1})/2^M$. Therefore, the resolution of the second signal S2 generated by running a PID algorithm is improved, and the stability for controlling the electromagnetic valve is increased.

Referring to the FIG. 7, again. The valve control circuit 75 coupled to the microprocessor 74 is used to generate an analog first openness control signal S3 based on the first control signal S1, and generate an analog second openness control signal S4 based on the second control signal S2 and the first coefficient P1. Specifically, the valve control circuit 75 comprises a first valve control circuit 751, a second valve control circuit 752, and a third valve control circuit 753. The first valve control circuit 751 is used to receive the first control signal S1 and convert it into an analog voltage V1 based on the proportion $P_{DA}$ of the initial digital-to-analog conversion, i. e., $V1=S1\times P_{DA}$, which is further converted into a corresponding first openness control signal S3. The second valve control circuit 752 is used to receive the second control signal S2 and convert it into an analog voltage V2 based on the first coefficient P1 and the proportion of the initial digital-to-analog conversion $P_{DA}$, i. e., $V2=S2\times P_{DA}/P1$, which is further converted into a corresponding second openness control signal S4. The first valve control circuit 751 and the second valve control circuit 752 are designed by the means of D/A or PWM filtering to proceed a digital-to-analog conversion for the first control signal S1 and the second control signal S2. The first coefficient P1 can be received from the microprocessor, or directly received from the valve model by the valve control circuit. The third valve control circuit 753 is coupled to the first valve control circuit 751 and the second valve control circuit 752. When only the first openness control signal S3 is received, the first openness control signal S3 is outputted to the electromagnetic valve 72 to control its opening. When the first openness control signal S3 and the second openness control signal S4 are simultaneously received, the superposition of them is outputted to the opened electromagnetic valve 72 to control its openness.

The flow control method for the mass flow control apparatus according to the present embodiment will be described in detail hereinafter by referring to specific examples. It is assumed that the flow rate setting signal AS1 is equal to 4.5V, and the corresponding control voltage of the electromagnetic valve is equal to 11V. The control method for using the mass flow control apparatus of the present invention in this embodiment is divided into two stages.

At the first stage, the flow rate setting signal, a voltage value received by the input terminal, e. g., 4.5V, is converted into the corresponding first digital signal DS1-4.5V at an initial analog-to-digital conversion proportion via the A/D converter 73 (e. g., voltage values of 0-5V correspond to 16-bit digital signals of 0-65535, respectively.). The valve model fitted by a piecewise function, characterizes a correspondence relation between the first digital signal and the first control signal, e. g., when the first digital signal DS1 corresponds to a setting flow rate of from 2% to 50% of a full scale, the received first control signal S1 equals to a digital signal DS1'-2V which corresponds to a voltage value of 2V; when the first digital signal DS1 corresponds to a setting flow rate of from 50% to 100% of a full scale, the received first control signal S1 equals to a digital signal DS1'-3V which corresponds to a voltage value of 3V. Therefore, the first digital signal DS1-4.5V received by the control module 741 is converted into the corresponding first control signal DS1'-3V for outputting to the first valve control circuit 751 based on the valve model. Then, the first control signal S1=DS1'-3V is converted into an analog voltage V1 based on the initial digital-to-analog conversion proportion $P_{DA}$ (e. g., 16-bit digital signals of 0-65535 correspond to voltage values of 0-5V, respectively) via the first valve control circuit 751, i. e., $V1=DS1'3 v\times P_{DA}$, which is further converted into the corresponding first openness control signal S3 with a control voltage value of 9V to be outputted to the third valve control circuit 753 for controlling the opening of the electromagnetic valve 72. Since the sensor unit 71 has not sensed the flow rate of the fluid in this process, the calculation module 742 and the second valve control circuit 753 remain in the not-operation state.

At the second stage, after opening the electromagnetic valve 72, a flow rate detection signal AS2 with a voltage value of 3V is received by the sensor unit 71, and converted into the second digital signal DS2-3V via the A/D converter 73 to be outputted to the calculation module 742 to execute a PID algorithm. Specifically, the calculation module 742 is firstly used to adjust the difference D in the first digital signal DS1-4.5V and the second digital signal DS2-3V by proportion of the first coefficient P1, i. e., the adjusted difference $D'=D\times 4.5/(4.5-3)$, of which the resolution is equal to 1.5V/65534, significantly improved comparing to the initial resolution 5V/65535. Then, the second control signal S2 is generates by running a proportional-integral-derivative (PID) algorithm for the adjusted difference D' by the calculation module 742, which resolution is also improved. After the generated second control signal S2 is outputted to the second valve control circuit 752 via the calculation module 742, the analog voltage V2 of the second control signal S2 is firstly generated based on the second control signal S2 and the adjusted digital-to-analog conversion proportion $P_{DA}'$, i. e., $V2=S2\times P_{DA}'$, wherein, the adjusted digital-to-analog conversion proportion $P_{DA}'$ is a ratio of the initial digital-to-analog conversion proportion $P_{DA}$ (e. g., 16-bit digital signals of 0-65535 correspond to voltage values of 0-5V, respectively) and the first coefficient P1, i. e., $P_{DA}'=P_{DA}/P1$. Then, the analog voltage V2 is converted into the corresponding valve control voltage of the second openness control signal S4 to be outputted to the third valve control circuit 753. Now, the first openness control signal S3 and the second openness control signal S4 are simultaneously received by the third valve control circuit 753. So, the superposition of them is outputted to the opened electromagnetic valve 72 to further regulate its openness. Finally, the second openness control signal S4 applied to the electromagnetic valve 72 is repeatedly adjusted until the valve control voltage of it reaches the value of 11V.

Figure 8:
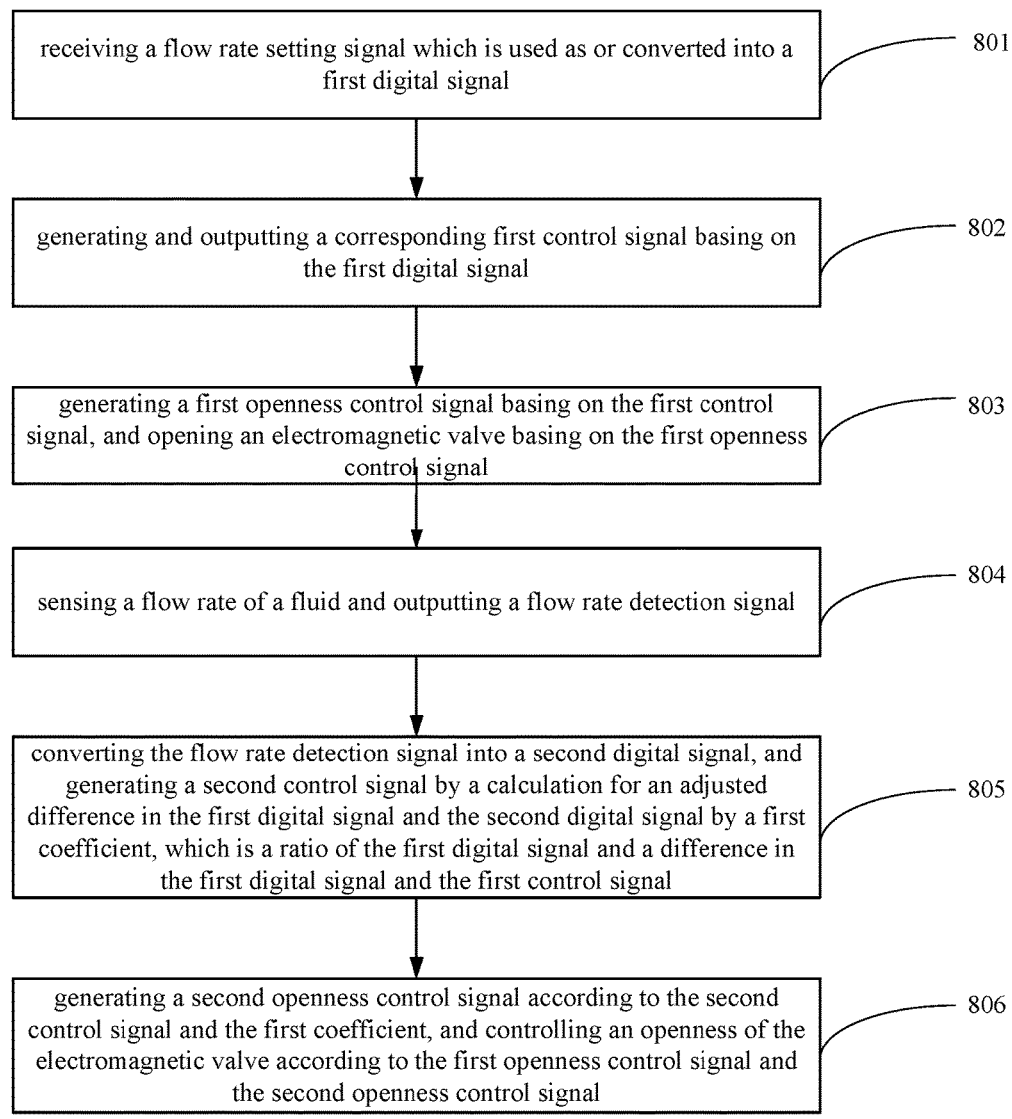
FIG. 8 is a flow sheet of a mass flow controlling method according to the second embodiment of the present invention.

A method of mass flow controlling applied to a mass flow control apparatus in the embodiment, shown in the FIG. 8, comprising the steps of:

S801, receiving a flow rate setting signal which is used as or converted into a first digital signal.

In this step, if the flow rate setting signal inputted from the input terminal is an analog signal AS1, it is converted into the first digital signal DS1 at the proportion $P_{AD}$ of the initial analog-to-digital conversion via the A/D converter. If the flow rate setting signal inputted from the input terminal is a digital signal, it is directly used as the first digital signal DS1 without conversion.

S802, generating a corresponding first control signal based on the first digital signal, and outputting it.

In this step, the first digital signal DS1 is converted into the corresponding first control signal S1 based on a valve model via the control module of the microprocessor. The valve model can be obtained based on pre-collected data, or fitted as a piecewise function or a continuous function based on the pre-collected data.

S803, generating a first openness control signal basing on the first control signal, and opening an electromagnetic valve basing on the first openness control signal.

In this step, the first control signal S1 is firstly converted into an analog signal by the initial digital-to-analog conversion proportion $P_{DA}$ (i. e. the reciprocal of the analog-todigital conversion proportion $P_{AD}$) via the first valve control circuit. And then the corresponding first openness control signal S3 is generated for opening the electromagnetic valve.

S804, sensing a flow rate of a fluid and outputting a flow rate detection signal.

In this step, after opening the electromagnetic valve by the first openness control signal S3, a fluid flows through the pipeline. Then, the sensor unit senses the flow rate of the fluid and outputs a flow rate detection signal AS2.

S805, converting the flow rate detection signal into a second digital signal, and generating a second control signal by a calculation for an adjusted difference in the first digital signal and the second digital signal by a first coefficient, which is a ratio of the first digital signal and a difference in the first digital signal and the first control signal.

In this step, the flow rate detection signal AS2 is firstly converted into a second digital signal DS2 at the proportion $P_{AD}$ of the initial analog-to-digital conversion via the A/D converter. Then, the difference D of the first digital signal DS1 and the second digital signal DS2 is adjusted by the first coefficient P1, i. e., the adjusted difference D'=D×P1. Wherein, the first coefficient P1 is a ratio of the first digital signal and a difference in the first digital signal and the first control signal, i. e., P1=DS1/(DS1−S1). Finally, the second control signal S2 is generated by running a PID algorithm for the adjusted difference D', and outputted. The resolution of the second control signal S2 is calculated by a formula of (AS1−voltage value corresponded by the S1)/$2^M$.

S806, generating a second openness control signal according to the second control signal and the first coefficient, and controlling an openness of the electromagnetic valve according to the first openness control signal and the second openness control signal.

In this step, the second control signal S2 is firstly converted into an analog voltage V2 based on the initial digital-to-analog conversion proportion $P_{DA}$ and the first coefficient P1, i. e., V2=S2×$P_{DA}$/P1. Then, the corresponding second openness control signal S4 is generated and outputted to the third valve control circuit 753 for further regulating the openness of the opened electromagnetic valve 72 by superposition with the first openness control signal S3. Finally, the steps S804-S806 are repeated until the flow rate of the fluid reaches the required flow rate.

Comparing to the first embodiment, the resolution of the difference of the received first digital signal and second digital signal by the calculation module is improved by the present embodiment, so that the resolution and accuracy of the second control signal are improved, and the stability of the second openness control signal to the control of the electromagnetic valve is increased.

The Third Embodiment

The present embodiment further improves the resolution and the accuracy of the first control signal on the base of the second embodiment.

The mass flow control apparatus of the present embodiment comprises: an input terminal, a sensor unit 71, a control unit and an electromagnetic valve 72. The control unit includes an A/D converter 73, a microprocessor 74 and a valve control circuit 75. The A/D converter 73, the sensor unit 71, and the input terminal play the same roles as the above-mentioned embodiments, so the detail description for them will be omitted.

The microprocessor 74 comprises a control module 741 and a calculation module 742. The control module 741 is used to receive the first digital signal DS1, which is not directly converted into the first control signal, but firstly converted into a corresponding decomposition signal DS1'. Then, the first control signal S1 is generated by adjusting the decomposition signal DS1' with a proportion. Specifically, a valve model is employed by the control module 741 to convert the first digital signal DS1 into the decomposition signal DS1', which is smaller than the first digital signal DS1. The valve model is stored in a storage module 743, such as EEPROM, and is used to characterize a correspondence relation between the first digital signal and the decomposition signal. The valve model may be obtained based on pre-collected data, for example, various first digital signals DS1 and the corresponding decomposition signals DS1' are recorded in the form of a table. The valve model also may be fitted as a piecewise function or a continuous function based on the pre-collected data, which is used to describe the correspondence relation between the first digital signal DS1 and the decomposition signal DS1'.

The control module 741 is used to generate a first control signal S1 by adjusting the decomposition signal DS1' with a second coefficient P2, i. e., S1=DS1'×P2. Wherein, the second coefficient P2 is calculated based on the valve model of the control module 741, which is a ratio of the first digital signal and the decomposition signal, i. e., P2=DS1/DS1'. If the flow rate setting signal AS1 ranged from 0 to AS1max is converted into a M-bit digital signal DS1 at an initial analog-to-digital conversion proportion $P_{AD}$ via the A/D converter, each digital signal corresponds a voltage range of AS1max/$2^M$, that is, the resolutions of the first digital signal is AS1max/$2^M$. But, after the decomposition signal DS1' is adjusted by the second coefficient P2, each digital signal corresponds a voltage range of AS1max/$2^M$ (AS1max' is the max voltage value corresponded by the adjusted decomposition signal). Due to DS1'<DS1, the resolution of the generated first control signal S1 is improved.

The calculation module 742 is used to generate a second control signal S2 by running a calculation (e. g., a PID algorithm) for an adjusted difference in the first digital signal DS1 and the second digital signal DS2 by a first coefficient P1. The calculation module 742 is also coupled to the storage module 743 for calculating the first coefficient P1, which is a ratio of the first digital signal DS1 and a difference in the first digital signal DS1 and the decomposition signal DS1', i. e., P1=DS1/(DS1−DS1'), based on a valve model. Before running a PID algorithm, the difference D in the first digital signal and the first control signal is adjusted to D' by proportion of the first coefficient P1, i. e. D'=D×P1. At this time, each digital signal corresponds a voltage range of (AS1max−AS1max')/$2^M$. Therefore, the resolution of the generated second control signal S2 is improved.

The valve control circuit 75 coupled to the microprocessor 74 is used to generate an analog first openness control signal S3 based on the first control signal S1 and the second coefficient P2, and generate an analog second openness control signal S4 based on the second control signal S2 and the first coefficient P1. Specifically, the valve control circuit 75 comprises a first valve control circuit 751, a second valve control circuit 752, and a third valve control circuit 753. The first valve control circuit 751 is used to receive the first control signal S1 and convert it into an analog voltage V1 based on the second coefficient P2 and the proportion $P_{DA}$ of the initial digital-to-analog conversion, i. e., V1=S1×$P_{DA}$/P2, which is further converted into a corresponding first openness control signal S3. The second valve control circuit 752 is used to receive the second control signal S2 and convert it into an analog voltage V2 based on the first coefficient P1 and the proportion $P_{DA}$ of the initial digital-to-analog conversion, i. e., $V2=S2\times P_{DA}/P1$, which is further converted into a corresponding second openness control signal S4. The first valve control circuit 751 and the second valve control circuit 752 are designed by the means of D/A or PWM filtering to proceed a digital-to-analog conversion for the first control signal S1 and the second control signal S2. The first coefficient P1 and the second coefficient P2 can be received from the microprocessor, or directly received from the valve model by the valve control circuit. The third valve control circuit 753 is coupled to the first valve control circuit 751 and the second valve control circuit 752. When only the first openness control signal S3 is received, the first openness control signal S3 is outputted to the electromagnetic valve 72 to control its opening. When the first openness control signal S3 and the second openness control signal S4 are simultaneously received, the superposition of them is outputted to the opened electromagnetic valve 72 to control its openness.

Figure 9:
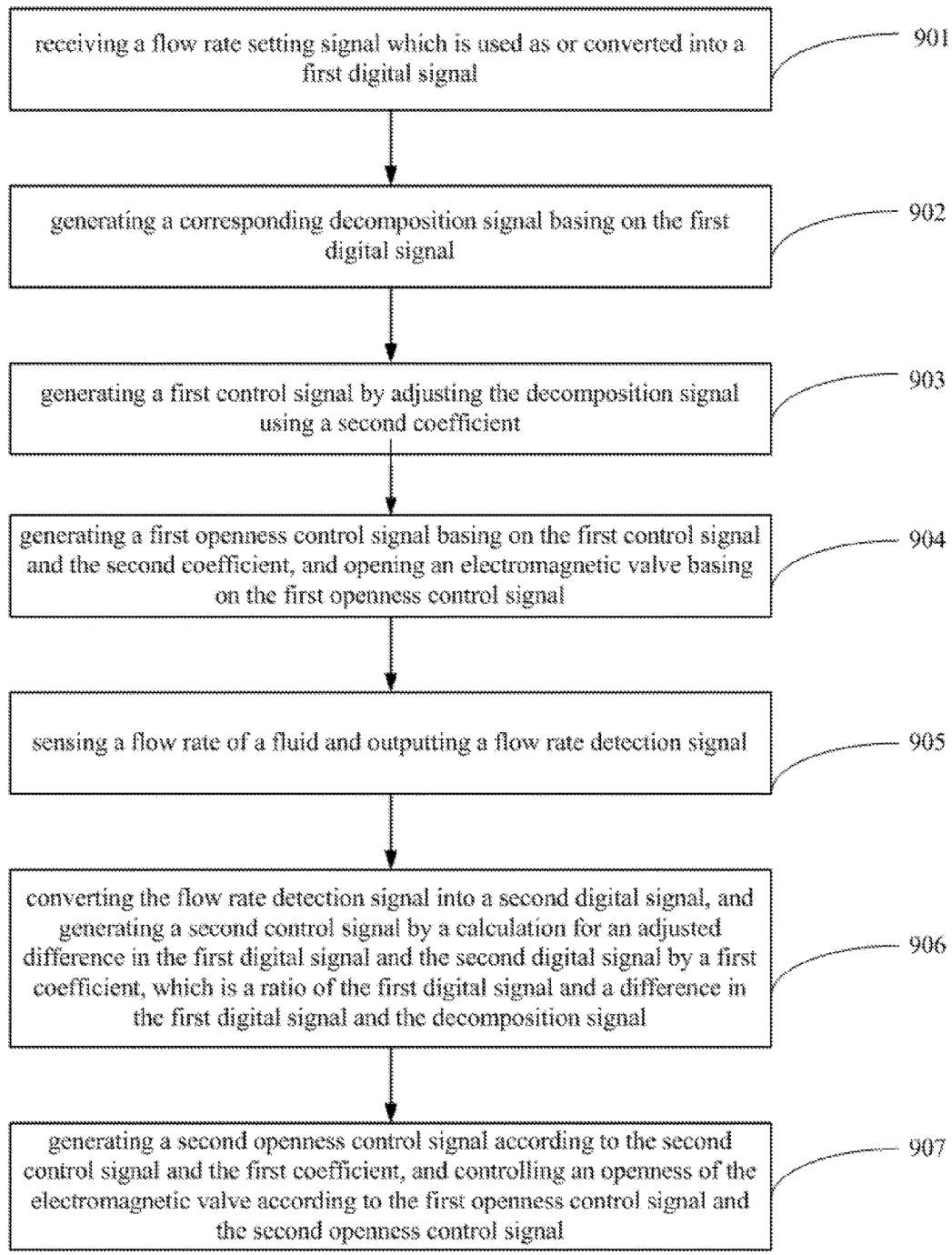
FIG. 9 is a flow sheet of a mass flow controlling method according to the third embodiment of the present invention.

A method of mass flow controlling applied to a mass flow control apparatus in the embodiment, shown in the FIG. 9, comprising the steps of:

S901, receiving a flow rate setting signal AS1 which is used as or converted into a first digital signal DS1.

In this step, if the flow rate setting signal inputted from the input terminal is an analog signal AS1, it is converted into a M-bit first digital signal DS1 at the proportion $P_{AD}$ of the initial analog-to-digital conversion via the A/D converter. If the flow rate setting signal inputted from the input terminal is a digital signal, it is directly used as the first digital signal DS1 without conversion.

S902, generating a corresponding decomposition signal basing on the first digital signal.

In this step, the first digital signal DS1 is converted into the corresponding decomposition signal DS1' based on a valve model via the control module of the microprocessor. The valve model can be obtained based on pre-collected data, or fitted as a piecewise function or a continuous function based on the pre-collected data. It is preferable that the decomposition signal DS1' is smaller than the first digital signal DS1.

S903, generating a first control signal by adjusting the decomposition signal with a second coefficient.

In this step, the first control signal S1 is calculated by a formula of S1=DS1'×P2, wherein, the second coefficient P2 is calculated by a formula of P2=DS1/DS1'. The resolution of the first control signal S1 is equal to $AS1'/2^M$, wherein, the AS1' is a voltage value converted by the decomposition signal DS1' with a proportion $P_{DA}$ of the initial digital-to-analog conversion.

S904, generating a first openness control signal based on the first control signal and the second coefficient, and opening an electromagnetic valve based on the first openness control signal.

In this step, the first control signal S1 is firstly converted into an analog signal V2, which is further converted into the corresponding first openness control signal S3, by the initial digital-to-analog conversion proportion $P_{DA}$ and the second coefficient P2 via the first valve control circuit, i. e., $V2=S3=S1\leq P_{DA}/P2$. And then the first openness control signal S3 is applied to the electromagnetic valve by the first valve control circuit for opening it.

S905, sensing a flow rate of a fluid and outputting a flow rate detection signal.

In this step, after opening the electromagnetic valve by the first openness control signal S3, a fluid flows through the pipeline. Then, the sensor unit senses the flow rate of the fluid and outputs a flow rate detection signal AS2.

S906, converting the flow rate detection signal into a second digital signal, and generating a second control signal by a calculation for an adjusted difference in the first digital signal and the second digital signal by a first coefficient, which is a ratio of the first digital signal and a difference in the first digital signal and the decomposition signal.

In this step, the flow rate detection signal AS2 is firstly converted into a second digital signal DS2 at the proportion $P_{AD}$ of the initial analog-to-digital conversion via the A/D converter. Then, the difference D of the first digital signal DS1 and the second digital signal DS2 is adjusted by the first coefficient P1, i. e., the adjusted difference D'=D×P1. Wherein, the first coefficient P1 is a ratio of the first digital signal and a difference in the first digital signal and the decomposition signal, i. e., P1=DS1/(DS1−DS1'). Finally, the second control signal S2 is generated by running a PID algorithm for the adjusted difference D', and outputted. The resolution of the second control signal S2 is calculated by a formula of. Finally, the second control signal S2 is generated by running a PID algorithm for the adjusted difference D', and outputted. The resolution of the second control signal S2 is calculated by a formula of $(AS1-AS1')/2^M$.

S907, generating a second openness control signal according to the second control signal and the first coefficient, and controlling an openness of the electromagnetic valve according to the first openness control signal and the second openness control signal.

In this step, the second control signal S2 is firstly converted into an analog voltage V2 based on the initial digital-to-analog conversion proportion $P_{DA}$ and the first coefficient P1, i. e., $V2=S2\times P_{DA}/P1$. Then, the corresponding second openness control signal S4 is generated and outputted to the third valve control circuit 753 for further regulating the openness of the opened electromagnetic valve 72 by superposition with the first openness control signal S3. Finally, the steps S905-S907 are repeated until the flow rate of the fluid reaches the required flow rate.

Due to improving the resolutions of the first control signal and the second control signal, the stability and the accuracy for controlling the electromagnetic valve in the present embodiment are increased.

In summary, the present invention generates two control signal, one of which is the first control signal generated by the flow rate setting signal for directly opening the electromagnetic valve to a certain openness, another of which is the second control signal generated by the flow rate setting signal and the flow rate detection signal for regulating the openness of the opened electromagnetic valve by superposition with the first control signal. That is, to further regulate the openness of the electromagnetic valve by running a PID algorithm after opening the electromagnetic valve to certain openness. Therefore, the nonlinear change of the electromagnetic force at the electromagnetic valve opening stage is avoided, and the response speed is accelerated.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A mass flow control apparatus, comprising:
an input terminal used to input a flow rate setting signal;

a sensor unit coupled to a fluid for sensing its flow rate and outputting a flow rate detection signal;

an electromagnetic valve coupled to the fluid for regulating its flow rate;

a control unit including:

an A/D converter converting the flow rate setting signal inputted by the input terminal into a first digital signal, and converting the flow rate detection signal outputted by the sensor unit into a second digital signal;

a microprocessor coupled to the A/D converter for receiving the first digital signal outputted by the A/D converter and the second digital signal outputted by the A/D converter, or receiving the first digital signal inputted directly by the input terminal and the second digital signal outputted by the A/D converter;

the microprocessor further including a control module used to generate and output a first control signal according to the corresponding first digital signal outputted by the A/D converter or inputted directly by the input terminal;

the microprocessor also including a calculation module used to generate and output a second control signal by running a calculation for a difference in the first digital signal outputted by the A/D converter or inputted directly by the input terminal and the second digital signal outputted by the A/D converter;

a valve control circuit coupled to the microprocessor for opening the electromagnetic valve according to the first control signal only, or regulating an openness of the electromagnetic valve according to the first control signal and the second control signal.

2. The apparatus according to claim 1, wherein the valve control circuit comprises:

a first valve control circuit used to receive the first control signal and generate a first openness control signal;

a second valve control circuit used to receive the second control signal and generate a second openness control signal;

a third valve control circuit coupled to the first valve control circuit and the second valve control circuit for receiving the first openness control signal and the second openness control signal to control the electromagnetic valve;

when only the first openness control signal is received, the first openness control signal is outputted to the electromagnetic valve to control its opening; when the first openness control signal and the second openness control signal are simultaneously received, the superposition of the first openness control signal and the second openness control signal is outputted to the opened electromagnetic valve to control its openness.

3. The apparatus according to claim 2, wherein the first valve control circuit and the second valve control circuit are designed by the means of D/A or PWM filtering to proceed a digital-to-analog conversion for the first control signal and the second control signal to generate the first openness control signal and the second openness control signal.

4. The apparatus according to claim 1, wherein the microprocessor also includes a storage module coupled to the control module for storing a valve model which characterizes a correspondence relation between the first digital signal and the first control signal; the control module outputs the first control signal corresponding to the first digital signal based on the valve model.

5. The apparatus according to claim 4, wherein the valve model is obtained based on pre-collected data.

6. The apparatus according to claim 5, wherein the valve model is fitted based on the pre-collected data by a fitting function which is a piecewise function or a continuous function.

7. A mass flow control apparatus, comprising:

an input terminal used to input a flow rate setting signal;

a sensor unit coupled to a fluid for sensing its flow rate and outputting a flow rate detection signal;

an electromagnetic valve coupled to the fluid for regulating its flow rate;

a control unit including:

an A/D converter converting the flow rate setting signal inputted by the input terminal into a first digital signal, and converting the flow rate detection signal outputted by the sensor unit into a second digital signal;

a microprocessor coupled to the A/D converter for receiving the first digital signal outputted by the A/D converter and the second digital signal outputted by the A/D converter, or receiving the first digital signal inputted directly by the input terminal and the second digital signal outputted by the A/D converter;

the microprocessor further including a control module used to generate a first control signal according to the corresponding first digital signal outputted by the A/D converter or inputted directly by the input terminal;

the microprocessor also including a calculation module used to generate a second control signal by running a calculation for an adjusted difference in the first digital signal outputted by the A/D converter or inputted directly by the input terminal and the second digital signal outputted by the A/D converter by a first coefficient, which is a ratio of the first digital signal and a difference in the first digital signal and the first control signal;

a valve control circuit coupled to the microprocessor for opening the electromagnetic valve according to the first openness control signal generated basing on the first control signal, or regulating an openness of the electromagnetic valve according to the first openness control signal and the second openness control signal; wherein, the second openness control signal is generated basing on the second control signal and the first coefficient.

8. The apparatus according to claim 7, wherein the valve control circuit comprises:

a first valve control circuit used to receive the first control signal and generate the first openness control signal basing on an initial digital-to-analog conversion proportion;

a second valve control circuit used to receive the second control signal and generate the second openness control signal basing on a ratio of the initial digital-to-analog conversion proportion and the first coefficient;

a third valve control circuit coupled to the first valve control circuit and the second valve control circuit for receiving the first openness control signal and the second openness control signal to control the electromagnetic valve; when only the first openness control signal is received, the first openness control signal is outputted to the electromagnetic valve to control its opening; when the first openness control signal and the second openness control signal are simultaneously received, the superposition of the first openness control signal and the second openness control signal is outputted to the opened electromagnetic valve to control its openness.

9. The apparatus according to claim 8, wherein the first valve control circuit and the second valve control circuit are designed by the means of D/A or PWM filtering to proceed a digital-to-analog conversion for the first control signal and the second control signal to generate the first openness control signal and the second openness control signal.

10. The apparatus according to claim 7, wherein the microprocessor also includes a storage module coupled to the control module and the calculation module for storing a valve model which characterizes a correspondence relation between the first digital signal and the first control signal; the control module generates the first control signal basing on the valve model; the calculation module calculates out the first coefficient basing on the valve model to generate the second control signal.

11. The apparatus according to claim 10, wherein the valve model is obtained basing on pre-collected data, or the valve model is fitted to a piecewise function or a continuous function based on the pre-collected data.

12. A mass flow control apparatus, comprising:
an input terminal used to input a flow rate setting signal;
a sensor unit coupled to a fluid for sensing its flow rate and outputting a flow rate detection signal;
an electromagnetic valve coupled to the fluid for regulating its flow rate;
a control unit including:
   an A/D converter converting the flow rate setting signal inputted by the input terminal into a first digital signal, and converting the flow rate detection signal outputted by the sensor unit into a second digital signal;
   a microprocessor coupled to the A/D converter for receiving the first digital signal outputted by the A/D converter and the second digital signal outputted by the A/D converter, or receiving the first digital signal inputted directly by the input terminal and the second digital signal outputted by the A/D converter;
   the microprocessor further including a control module used to generate a first control signal according to an adjusted decomposition signal by a second coefficient, wherein, the decomposition signal is generated by the first digital signal, and the second coefficient is a ratio of the first digital signal and the decomposition signal;
   the microprocessor also including a calculation module used to generate a second control signal by running a calculation for an adjusted difference in the first digital signal outputted by the A/D converter or inputted directly by the input terminal and the second digital signal outputted by the A/D converter by a first coefficient, which is a ratio of the first digital signal and a difference in the first digital signal and the decomposition signal;
   a valve control circuit coupled to the microprocessor for opening the electromagnetic valve according to the first openness control signal generated basing on the first control signal and the second coefficient, or regulating an openness of the electromagnetic valve according to the first openness control signal and the second openness control signal; wherein, the second openness control signal is generated basing on the second control signal and the first coefficient.

13. The apparatus according to claim 12, wherein the valve control circuit comprises:
   a first valve control circuit used to receive the first control signal and generate the first openness control signal basing on a ratio of an initial digital-to-analog conversion proportion and the second coefficient;
   a second valve control circuit used to receive the second control signal and generate the second openness control signal basing on a ratio of the initial digital-to-analog conversion proportion and the first coefficient;
   a third valve control circuit coupled to the first valve control circuit and the second valve control circuit for receiving the first openness control signal and the second openness control signal and outputting them to the electromagnetic valve; when only the first openness control signal is received, the first openness control signal is outputted to the electromagnetic valve to control its opening; when the first openness control signal and the second openness control signal are simultaneously received, the superposition of the first openness control signal and the second openness control signal is outputted to the opened electromagnetic valve to control its openness.

14. The apparatus according to claim 13, wherein the microprocessor also includes a storage module coupled to the control module and the calculation module for storing a valve model which characterizes a correspondence relation between the first digital signal and the decomposition signal; the control module calculates out the second coefficient basing on the valve model to generate the first control signal; the calculation module calculates out the first coefficient basing on the valve model to generate the second control signal.

15. The apparatus according to claim 12, wherein the microprocessor also includes a storage module coupled to the control module and the calculation module for storing a valve model which characterizes a correspondence relation between the first digital signal and the decomposition signal; the control module calculates out the second coefficient basing on the valve model to generate the first control signal; the calculation module calculates out the first coefficient basing on the valve model to generate the second control signal.

16. The apparatus according to claim 15, wherein the valve model is obtained based on pre-collected data, or the valve model is fitted to a piecewise function or a continuous function based on the pre-collected data.

* * * * *